Dec. 16, 1958 H. C. GOODRICH 2,864,888

AUTOMATIC GAIN CONTROL CIRCUITS

Filed Aug. 24, 1953

INVENTOR.
HUNTER C. GOODRICH

BY [signature]

ATTORNEY

United States Patent Office 2,864,888

Patented Dec. 16, 1958

2,864,888

AUTOMATIC GAIN CONTROL CIRCUITS

Hunter C. Goodrich, Collingswood, N. J., assignor to Radio Corporation of America, a corporation of Delaware Application August 24, 1953, Serial No. 376,193

14 Claims. (Cl. 178—7.3)

The present invention relates to improvements in automatic gain control circuits and more particularly, although not necessarily exclusively, to automatic gain control circuits of the type frequently employed in television radio receivers.

More specifically, the present invention relates to improved automatic gain control circuits of a type embodying semiconductor signal translating devices and semiconductor amplifying devices such as transistors.

In radio receiving signal systems it has long been the practice to provide some means for automatically adjusting the gain of the radio signal receiving system as an inverse function of received signal strength whereby to maintain the demodulated output signal at a substantially constant amplitude for large variations in received signal strength. In amplitude modulated sound broadcast radio signal receiving systems this automatic gain control action may be accomplished on the basis of average carrier strength. This is possible because of the modulation being substantially symmetrical with respect to an average zero modulation signal level referred to as the carrier.

In television signal receiving systems, the problem is known to be complicated by the fact that the average carrier strength as detected in the receiver, varies as a function of both the received signal strength and the direct current component or brightness component of the scene being televised. It is, therefore, necessary to provide an automatic gain control voltage developing system which is responsive only to a datum portion of the television signal. This datum portion is usually taken as the peak excursion of the television synchronizing pulses which are always transmitted as a predetermined percentage of modulation of the television radio carrier.

Due to the fact that the synchronizing signal portion of a broadcast television signal is represented by peak excursions of the composite television waveform, it has been common practice to combine the function of synchronizing signal separation in the receiver with that of developing an automatic gain control potential, since both these functions have to do with the synchronizing signal itself which may be considered as a datum level. It is generally desirable in separating the synchronizing signal component from the composite television signal to effectively double-clip the synchronizing signal component. The first clipping action is accomplished at a level slightly above blanking whereby to eliminate blanking and video information in the separated synchronizing signal information. The second aspect of the double-clipping action deals with a level slightly below synchronizing signal peak whereby to eliminate noise excursions appearing with amplitudes in excess of sync peaks. In prior art vacuum tube synchronizing signal processing circuits, the second phase of the double-clipping of the synchronizing signal had to take place at a circuit position subsequent to the automatic gain control voltage developing function, since once double-clipped, the synchronizing signal no longer conveyed information as to the peak amplitude of the received television signal.

The present invention takes novel advantage of the unique characteristics of semiconductor amplifier devices such as, for example, the transistor, to achieve both double sync clipping and automatic gain control voltage generation in a single processing stage. Use is made of the collector current saturation of a semiconductor device to obtain upper limiting or clipping of separated synchronizing signal with the lower clipping threshold being established by reverse bias on the emitter-base circuit of the semiconductor amplifier. This double-clipping technique, per se, is described and claimed in copending U. S. patent application, Serial No. 376,138, filed August 24, 1953, entitled Amplitude Discriminatory System, by Hunter C. Goodrich. The present invention, however, supplements this novel circuit action by means responsive to the increased emitter-base current flow occurring when the condition of collector current saturation is established. Since, in accordance with the present invention, collector current saturation is established by the higher amplitude excursions of the synchronizing signal, automatic gain control information may be obtained from the base-emitter circuit due to the increased current therein, even though synchronizing signal peaks exceed collector saturation.

It is, therefore, an object of the present invention to provide an improved automatic gain control system for radio receiving circuits.

It is another object of the present invention to provide an improved automatic gain control circuit embodying semiconductor amplifier devices.

It is a further object of the present invention to provide an improved signal processing circuit for television receiving systems which provides both double-clipping of the received synchronizing signal as well as a source of automatic gain control potential.

It is yet another object of the present invention to porvide an automatic gain control circuit utilizing transistors suitable for use in television receiving circuits.

Other objects and features of advantage of the present invention will become apparent, as well as a better understanding of the principles underlying its operation, from a reading of the following specification, especially when taken in connection with the accompanying drawings, in which.

Figure 1:
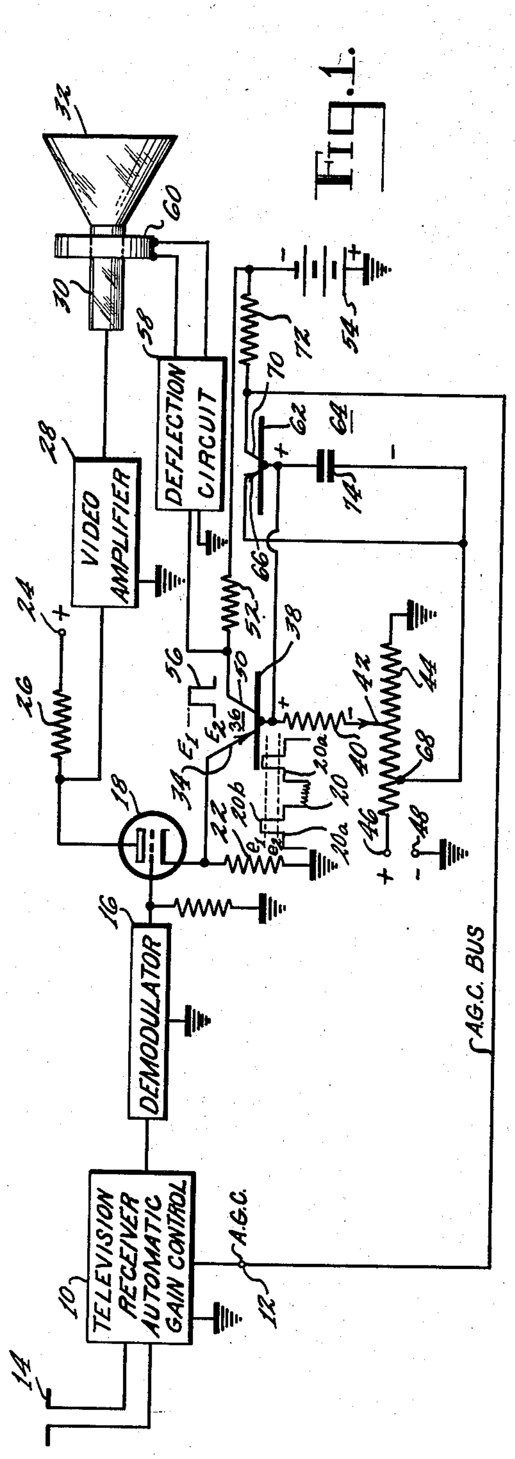
Figure 1 is a combination block and schematic representation of one form of the present invention as applied to a television receiver.

Turning now to Figure 1, there is shown in block form at 10 the components of a television receiver comprising a tuner, intermediate frequency amplifier, sound channel and automatic gain control terminal 12 to which an automatic gain control voltage is to be applied. Signals from the antenna 14 are processed by the receiver elements 10 and applied to a demodulator circuit 16. The demodulated television signal developed by the demodulator 16 is in turn applied to a cathode follower stage 18 to appear as video signal 20 across the cathode load resistor 22. Anode power for the operation of the cathode follower stage 18 is obtained from a positive power supply terminal 24 referenced with respect to circuit ground. Load resistor 26 allows video signal to be developed for application to a video amplifier 28. Output signals from the video amplifier 28 are applied to the kinescope 30 for reproduction of a television picture on the screen 32 thereof.

In accordance with the present invention, video signal 20 appearing across the cathode load resistor 22 is coupled to the emitter 34 of a semiconductor signal translating device 36. Purely by way of example, the semiconductor device 36 has been indicated as being equivalent to a P–N–P type junction transistor amplifier, insofar as the operation of the present invention is concerned. The base 38 of the amplifier device 36 is connected through a base load resistor 40 to a tap 42 on a bleeder resistance means 44. The bleeder 44 is connected from a positive power supply terminal 46 to circuit ground to which the negative power supply terminal 48 is connected. The collector 50 of the amplifier 36 is connected through load resistor 52 to a source of negative biasing potential 54 referenced with respect to circuit ground. The separated synchronizing signal 56, as described hereinafter, is applied to conventional deflection circuit illustrated by the block 58 whose developed deflection signals are appropriately applied to a beam deflection yoke means 60.

Still in accordance with the present invention, as illustrated in Figure 1, the base 38 of the amplifier device 36 is direct current coupled to the base 62 of semiconductor amplifier device 64. The amplifier device 64 has also, by way of example, been illustrated as being of the P–N–P transistor type. The emitter 66 thereof is connected with a tap 68 on the bleeder 44. The tap 68 is more positive relative to circuit ground than the tap 42 whereby to apply a forward bias to the amplifier device 64. The collector 70 of the amplifier device 64 is appropriately connected through a collector load resistor 72 to a source of negative potential 54 so as to apply reverse bias to the collector 70. A capacitor 74 is effectively connected in shunt with the resistor 40 to form a time constant circuit whose time constant value may be made greater than the recurrence period of the separated synchronizing signal 56.

The operation of the embodiment of the present invention shown in Figure 1 is substantially, as follows:

The tap 42 on bleeder 44 is so positioned that a net reverse bias is placed on the emitter-base circuit of a magnitude which will prevent emitter current flow for signal levels below $e_2$ shown in relation to the video signal waveform 20. Level $e_2$ is shown to be established slightly above the blanking level 20*a*. This permits only the synchronizing portion 20*b* of the video signal 20 to produce emitter collector current flow in the amplifier device 36. Under normal operating conditions, however, the amplitude of the video signal 20 is so proportioned relative to the characteristics of amplifier device 36 and the value of the collector load resistor 52 as to produce collector current saturation in the amplifier. Collector current saturation occurs when the current through the load resistor 52 is sufficient to drop the potential of the collector 50 to the potential of the base 38. This will define the upper limit $E_1$ of the output waveform 56, the lower limit $E_2$ corresponding to level $e_2$ of the waveform 20. The saturation level at $e_1$ (waveform 20) is seen to occur slightly below the tips of the synchronizing signal component 20*b*. Any noise or unwanted signal excursions in excess of sync peaks will, therefore, be clipped. The resulting output signal 56 will then represent double-clipped synchronizing signal suitable for application to the deflection circuit 58.

In further accordance with the novel operation of the present invention, and still looking at Figure 1, should the received signal increase in amplitude, the emitter current will tend to increase in the direction of driving the amplifier 36 further into collector saturation. However, since the collector 50 will accept no additional current flow, the increased emitter current flow will occur by way of emitter-base conduction. The current through the base resistor 40 will, therefore, increase and the voltage drop across the resistor 40 will increase. Capacitor 74 substantially in shunt with resistor 40 will provide a storage action so as to integrate the pulsed variation of voltage across the resistor 40 and thereby develop an average bias across resistor 40 of a value representing incoming signal amplitude. Since the voltage across resistor 40 is representative of incoming signal amplitude in excess of the saturation and clipping level $e_1$, it may be used as a source of automatic gain control information. The connection of amplifier device 64 as described above permits such utilization to be made.

In the arrangement of Figure 1, as the potential appearing across the capacitor 74 rises due to an increase in signal strength, the base 62 of the amplifier device 64 will become more positive with respect to the emitter 66. This will reduce the effective forward emitter-base bias and reduce collector current flowing through collector load resistor 72. Since the collector 70 is connected with a negative source of bias potential 54, the potential of the collector 70 will become more negative as collector current is reduced. The potential at the collector 70 is, therefore, useful directly as an AGC potential for application to the control electrode circuits of signal amplifiers such as for example may be connected with the AGC terminal 12 within the block 10. A corresponding decrease in signal strength will result in less base current flow in the amplifier 36 which in turn will reduce the potential appearing across the capacitor 74. This will effectively increase the emitter-base bias on the amplifier 64 to result in increased collector current flow and a reduction in the negative value of the collector 70. This constitutes a positive going rise in automatic gain control voltage to increase the gain of the television receiver and hence tend to compensate for the initial reduction in signal strength.

Figure 2:
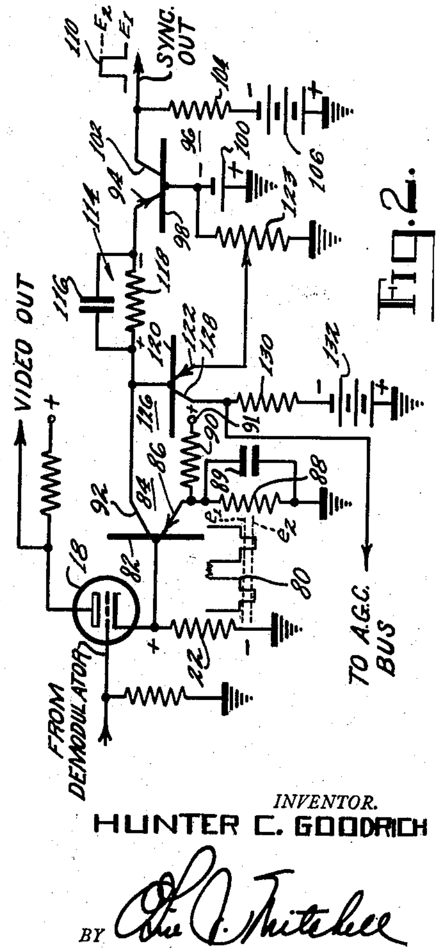
Figure 2 illustrates a schematic representation of another form of the present invention in its application to a television system.

The embodiment of the invention shown in Figure 2 employs substantially the same principles involved in the circuitry of Figure 1. However, in Figure 2 the signal from the demodulator is assumed to be in the sync negative direction so that the video signal developed across the cathode load resistor 22 is in the sync negative direction as shown at 80. The cathode load resistor 22 is direct current coupled to the base 82 of a semiconductor amplifier device 84 indicated, only by way of example, as being equivalent to a P–N–P transistor. The emitter 86 of the amplifier device 84 is connected with circuit ground through an emitter load resistor 88 having connected in shunt therewith capacitor 89. A bleeder resistor 90 is then connected from a source of positive potential having its terminal at 91 (referenced with respect to circuit ground) to the upper extremity of emitter load resistor 88 to establish a proper operating bias for the amplifier device 84. The collector 92 of the amplifier device 84 is direct current coupled to the emitter 94 of another semiconductor amplifier device 96. The base 98 of the amplifier 96 is connected with a negative bias supply 100 referenced to circuit ground. The collector 102 is in turn connected through a collector load resistor 104 to an appropriate source of negative voltage at 106, also referenced with respect to circuit ground. Double-clipped separated synchronizing pulses 110 will be developed across the collector load resistor 104 as described hereinafter.

In further accordance with the embodiment of the present invention shown in Figure 2, it is noted that the direct current connection between collector 92 of amplifier device 84 and the emitter 94 of amplifier device 96 includes a time constant network 114 comprising capacitor 116 and resistor 118. Emitter current flow in amplifier device 96 produces across the time constant network 114 a potential which is applied between the base 120 and emitter 122 of still another semiconductor amplifier device 126. Potentiometer means 123 is connected in shunt with bias supply 100 to provide means for adjusting the emitter-base bias on the amplifier device 126. The collector 128 of this latter amplifier device is connected through a collector load resistor 130 to a source of negative bias potential at 132 Automatic gain control voltage suitable for application to the automatic gain control bus of Figure 1, or for use as an automatic gain control potential in other types of television systems, will be available at the collector extremity of collector load resistor 130 as described hereinafter.

In the operation of the embodiment shown in Figure 2, it will be seen that static current flow through the cathode load resistor 22 of vacuum tube 18 will tend to bias the emitter-base circuit of the amplifier 84 in a reverse direction. This reverse bias is opposed at least in part by the forward bias influence provided by resistor 90 connected with a positive power supply source having its terminal at 91. Thus, as the cathode of the vacuum tube amplifier 18 swings in a negative direction, in accordance with the video signal 80, the reverse emitter-base bias may be overcome to produce emitter-collector conduction in the amplifier. The emitter current passing through the emitter load resistor 88 will develop a potential across the storage capacitor 89 of the polarity indicated so as to constitute a further reverse biasing influence. However, by properly proportioning the forward bias influence provided by the resistor 90, the amplifier 84 may be made to conduct at a level $e_1$ (waveform 80) negatively in excess of blanking. This in effect clips the synchronizing component from the composite video signal. As described in the copending U. S. patent application, Serial No. 376,138, by Hunter C. Goodrich, entitled Amplitude Discriminatory System, filed August 24, 1953, an increase in signal amplitude across the cathode load resistor 22 will be at least partially compensated by the increased reverse bias developed across capacitor 89, due to increased emitter current flow so as to maintain the clipping level $e_1$ at approximately its same relative level with respect to the waveform 80.

As described above, the collector of amplifier device 84 is direct current connected with semiconductor amplifier device 96 so that emitter-collector current through amplifier device 84 must pass through the emitter electrode of the amplifier device 96. The amplifier device 96 is emitter-base biased in a forward direction by means of the bias supply means 100, which maintains the base 98 at a potential negative with respect to the emitter 94. The net forward emitter-base bias current on the amplifier device 96 is so adjusted and the value of the resistor 104 so proportioned that collector saturation is established in the amplifier 96 at a level $e_2$ (waveform 80) slightly below the peak of the synchronizing pulse component. The output pulse 110 appearing across resistor 104 will then have an upper limit $E_2$ defined by collector saturation in the amplifier device 96 and a lower limit $E_1$ defined by initial conduction in the amplifier device 84. Inasmuch as the amplifier device 96 is, under normal operating conditions, driven into collector saturation, the emitter-base current of the amplifier 96 will continue to increase with an increase in signal level, even though the output pulse 110 is limited. Emitter current flow through resistor 118 will, therefore, cause a voltage of the polarity indicated to be developed across the capacitor 116 which will increase in the indicated polarity as signal intensity increases. The potentiometer 123 has been adjusted so that the amplifier device 126 is normally operating in a collector saturated condition by insuring that the emitter 122 is sufficiently positive with respect to the base 120. As the potential drop across resistor 118 increases due to increased signal strength, the emitter-base current in amplifier device 126 will decrease thereby reducing the voltage drop across the collector load resistor 130 and increasing the negative potential on the AGC bus. Correspondingly, a reduction in the amplitude of received signal will produce less emitter current flow in the amplifier device 96 so as to reduce the potential drop across the resistor 118. This will in turn increase the emitter base flow in amplifier 126 so that the increased collector current through resistor 130 will render the AGC bus less negative with respect to circuit ground and conventionally increase the gain of the receiver.

Figure 3:
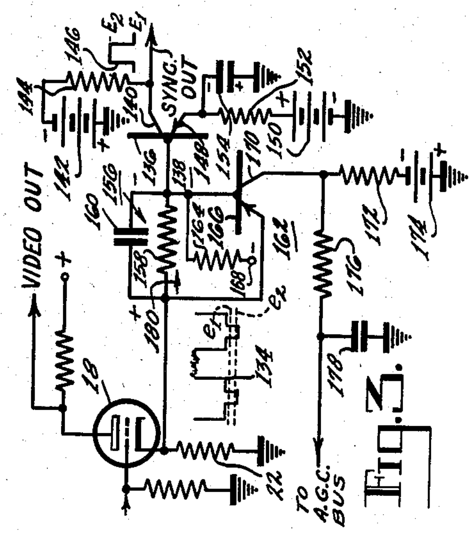
Figure 3 is a schematic representation of still another form of the present invention as applied to a television system.

Turning now to Figure 3, a still further embodiment of the present invention is shown in which combined double sync clipping and AGC voltage developing action is obtained. In this embodiment, video signal 134 of a sync negative polarity is assumed to appear across the cathode follower load resistor 22. The cathode of the cathode follower amplifier vacuum tube 18 is direct current coupled to the base 136 of a semiconductor amplifier device 138 indicated, by way of example, as being equivalent to a P–N–P transistor. The collector 140 of the amplifier device 138 is connected with a negative source of bias supply at 142 through a collector load resistor 144 across which separated synchronizing signal 146 is developed. The emitter 148 is connected with a forward bias supply 150 through a load resistor 152. Capacitor 154 forms a time constant circuit with the resistor 152 which has substantially the same function as the time constant circuit 88—89, described in connection with Figure 2. Time constant network 156, connected between the cathode of the cathode follower tube 18 and the base 136 of amplifier device 138, comprises a resistor 158 and capacitor 160. Another semiconductor amplifier device 162 is adapted to include the resistor 158 in its emitter-base path. A resistor 164 is connected from the base 166 to a source of negative potential, referenced with respect to circuit ground, having a terminal at 168. The collector 170 of the amplifier device 162 is connected through an emitter load resistor 172 to a source of negative power supply potential at 174. The time constant filtering circuit comprising resistor 176 and capacitor 178 is connected in shunt with the load resistor 172.

In the operation of the embodiment of the invention shown in Figure 3, it will be assumed that the value of potential available at terminal 168 and the value of the resistor 164 is such that the net current passing through resistor 158 is in the direction of the arrow 180. This will develop a charge across the capacitor 160 with the polarity indicated. It will be assumed that under low signal conditions, the value of the potential across the capacitor 160 is sufficient to forwardly bias the amplifier 162 into collector saturation, whereby the potential of the collector 170 is at some minimum negative value with respect to ground due to the voltage drop across the load resistor 172. Moreover, it will be assumed that the value of the bias supply 150 is sufficient relative to the reverse bias effects of the voltage drop across the cathode load resistor 22 as well as the charge across the capacitor 154 to permit conduction in the amplifier 138 for signal values corresponding to level $e_1$ (waveform 134). This level of current conduction in the amplifier 138 will define the lower extremity $E_1$ of the output waveform 146. The upper extremity of the waveform $E_2$ of the output waveform 146, as in the previous embodiments discussed, corresponds to collector saturation and represents the clipping level $e_2$ (waveform 134).

In the arrangement of Figure 3, should the incoming signal applied to the cathode follower 18 increase in amplitude, the base-emitter current of the amplifier device 138 will increase even though the collector is at saturation as described above. Increased emitter-base current flow in the amplifier 138 will cause a net reduction in the current flowing through resistor 158, since emitter-base current flow in the amplifier 138 is opposite in direction to the preponderance of current flow indicated by arrow 180. Forward current in the emitter-base path of the amplifier device 162 will, therefore, decrease and the voltage drop across the collector load resistor 172 will be lessened thereby causing the AGC bus to assume a more negative potential which is commonly required to decrease the gain of a television receiver signal amplifier.

From the above, it will be seen that the present invention has provided a new and improved signal processing circuit which readily lends itself in television receiving systems, to the combined function of double synchronizing signal clipping as well as the development of an automatic gain control voltage. It will be appreciated that although the present invention has been illustrated in connection with waveforms which are typical of television receiving systems, that the value of its signal processing capabilities is in no way limited to television. Any signal intelligence having a pulse component which is to be separated and whose peak value is representative of datum signal information will find valuable use of the techniques and circuitry taught by the present invention.

What is claimed is:

1. In a signal processing circuit the combination of: a source of intelligence signal; a semiconductor signal translating device having electrodes corresponding to an emitter, base and collector; first impedance means galvanically connected between said emitter and said base to form a first loop circuit; signal coupling means from said signal source to said first loop circuit to apply an input signal to said device; second impedance means connected between said collector and said base defining a second loop circuit extending from said emitter to said collector; bias means connected with said second loop circuit in a polarity direction supporting amplifier action, the value of said second impedance means being so chosen as to allow collector saturation by excursions of said input signal; means connected in said first loop circuit for developing a control voltage in accordance with current flow through said first loop circuit; and means for applying said control voltage to said signal source for controlling the amplitude of signal delivered to said first loop circuit by said signal source.

2. In a signal processing circuit, the combination of: a source of intelligence signal of controllable amplitude; a semiconductor signal translating device having electrodes corresponding to an emitter, base and collector; first impedance means connected between said emitter and said base to form a first loop circuit; signal coupling means from said signal source to said first loop circuit to apply an input signal to said device; second impedance means connected between said collector and said emitter defining a second loop circuit; bias means connected with said output circuit in a polarity direction supporting amplifier action, the value of said second impedance means being so chosen as to allow collector saturation by excursions of said input signal; means connected in said first loop circuit responsive to average current flow therethrough to develop a control potential; and means for applying said control potential to said controllable amplitude intelligence signal source for controlling the amplitude of signal applied to said first loop circuit.

3. A signal processing circuit, according to claim 2, wherein said signal source reduces the amplitude of signal applied to said first loop circuit in response to increased current flow in said first loop circuit.

4. In a signaling system, the combination of: a source of controllable amplitude signal; means included in said last named means for controlling the amplitude of signal delivered by said source in accordance with a control potential; a semiconductor amplifier device having electrodes corresponding to a base, emitter and collector; a first galvanically conductive impedance means connected between said collector and said emitter to define a first loop circuit; a second galvanically conductive impedance means connected between said emitter and said base to define a second loop circuit; means connected with said second loop circuit for developing a control potential in accordance with current flow through said second loop circuit; and means coupled with said control potential developing means for applying said control potential to said amplitude control means for controlling the amplitude of signal applied to said second loop circuit in accordance with said developed control potential.

5. In a signaling system, the combination of: a source of controllable amplitude signal; means included in said last named means for controlling the amplitude of signal delivered by said source in accordance with a control potential; a semiconductor amplifier device having electrodes corresponding to a base, emitter and collector; a first galvanically conductive impedance means connected between said collector and said base to define a first loop circuit; a second galvanically conductive impedance means connected between said emitter and said base; signal coupling means connected from said source to said second loop circuit; means connected with said emitter for developing a control potential in accordance with emitter current; and means for applying said control potential to said amplitude controlling means for controlling the amplitude of signal delivered to said second loop circuit.

6. In a signaling system, according to claim 5, wherein said first loop circuit includes impedance means of a value permitting collector current saturation to occur in said amplifier device by signal excursions supplied by said signal source.

7. In an electrical signaling system, the combination of: a signal amplifier having an output circuit; means coupled with said amplifier for controlling the gain thereof in accordance with a gain control potential; a semiconductor amplifier device having electrodes corresponding to a base, emitter and collector; input circuit means connected with said emitter and base; output circuit means connected with said collector and base; means connected with said emitter for developing a potential which is a function of current flow from said emitter; signal coupling means connected from said signal amplifier output circuit to said amplifier device input circuit; and means coupled with said potential developing means for applying said potential to said gain control means for controlling the gain of said signal amplifier in accordance with conditional emitter current flow.

8. In an electrical signaling system, the combination of: a signal amplifier having an output circuit; means coupled with said signal amplifier for controlling the gain thereof in accordance with a control potential; a semiconductor amplifier device having electrodes corresponding to a base, emitter and collector; a first impedance means connected between said base and said emitter to define a first loop circuit; a second impedance means connected between said collector and said base to define a second loop circuit; signal coupling means connected from said signal amplifier output circuit to said first loop circuit to apply input signal to said semiconductor amplifier device; means included in said first loop circuit for developing a control potential in response to emitter current flow therein; and means coupled with said control potential developing means for applying said control potential to said amplifier gain controlling means for controlling the gain of said signal amplifier in accordance with said control potential.

9. In a signal processing system, the combination of: a signal amplifier having an output circuit designated to conditionally deliver an intelligence signal having peak excursions of datum level; means connected with said amplifier for varying the gain thereof in accordance with a control potential; a first semiconductor amplifier device having a base, emitter and collector; a circuit ground against which said signal amplifier output circuit is electrically referenced; a resistor connected between said base and circuit ground; a capacitor connected substantially in shunt with said resistor; signal coupling means from said amplifier output circuit to said emitter including direct current path means from said emitter to circuit ground; bias means coupled with both said base and said emitter for preventing emitter current for signal excursions substantially below said datum level excursions; colletcor circuit power supply bias means referenced with respect to circuit ground; a resistor connected from said collector to said collector circuit bias means of sufficient value to permit collector circuit saturation by peak datum excursions of signal delivered by said amplifier device; a second semiconductor amplifier device having an emitter, base and collector; a direct current path means connected between the base of said first amplifier device and the base of said second amplifier device; forward emitter curent bias means connected between said second amplifier emitter and circuit ground; a resistor connected between said second amplifier collector and a source of collector bias voltage; and means providing a connection from said second amplifier collector to said amplifier gain control means.

10. A signal processing system, according to claim 9, wherein the datum level excursions of said signal are periodic in nature and wherein the time constant value of said resistor and capacitor connected with said base of said first amplifier device is substantially greater than the recurrence period of said datum signal excursions.

11. In an electrical signal system, the combination of: a signal amplifier having an output circuit designated to conditionally deliver intelligence signals having peak excursions of datum level; a first semiconductor amplifier device having an emitter, base and collector; a circuit ground; resistance means connected from said base to said circuit ground; signal coupling means connected from said signal amplifier output circuit to said base; direct current path means connected from said emitter to circuit ground; a second semiconductor amplifier device having an emitter, base and collector; a resistor connected between said first amplifier device collector and said second device emitter; a capacitor connected in shunt with said last named resistor; forward emitter base bias means connected between said second device base and circuit ground; a source of operating power for said second device collector; a resistor connected from said second device collector and said last named power source, the value of said resistor being sufficient to permit collector saturation in said second device by peak excursions of said intelligence signals; bias means connected with said first amplifier device for preventing emitter-base current flow therein for signal excursions below said datum level; a third semiconductor amplifier device having emitter, base and collector; a direct current path means connected from said first semiconductor amplifier device collector to said third amplifier device base; direct current path means connected from said second amplifier device base to said third amplifier device emitter; a source of collector operating power for said third amplifier device; a resistor connected between said third amplifier device collector and said last named power source; means connected with said signal amplifier for varying the gain thereof in accordance with a control potential; and a connection from said last named means to said third amplifier device collector.

12. An electrical signal system, according to claim 11, wherein the said datum level peak excursions are periodic in recurrence and wherein the time constant value of said resistor connected between said first amplifier device collector and said second amplifier device emitter taken in combination with the capacitor thereacross is of a value greater than the recurrence period of said datum signal excursions.

13. In an electrical signaling system, the combination of: a variable gain signal amplifier having an output circuit designated to conditionally deliver intelligence signals having peak excursions of datum level; a first semiconductor amplifier device having an emitter, base and collector; a circuit ground; a parallel resistance capacitance time constant circuit connected between said amplifier output circuit and said first amplifier device base, the polarity of said signal excursions being in the direction of forward bias between said base and emitter electrodes, said amplifier output circuit providing a direct current path to circuit ground; a direct current path means connected between said first amplifier device emitter and circuit ground; a source of collector operating potential for said first amplifier device; a resistor connected from said collector to said operating power source, the value of said resistor being sufficient to permit collector saturation in said first amplifier for signal excursions of datum level; a second semiconductor amplifier device having a base, emitter and collector; direct current connections between said second amplifier device base, emitter and said time constant circuit so as to place said time constant circuit between said base and said emitter; a source of operating power for said second amplifier device collector; a resistor connected between said second amplifier device collector and said last named source of operating power; means connected with said signal amplifier for varying the gain thereof in accordance with a control potential; and a connection between said last named means and said second amplifier collector.

14. In a signal processing circuit the combination of: a source of intelligence signal; a semiconductor signal translating device having electrodes corresponding to an emitter, base and collector; first impedance means connected between said emitter and said base to form a first loop circuit; signal coupling means from said signal source to said first loop circuit; second impedance means connected beteen said collector and said base defining a second loop circuit; bias means connected with said second loop in a polarity direction supporting amplifier action, the value of said second impedance means being so chosen as to allow collector saturation by excursions of signals applied to said first loop circuit; current responsive means connected in said first loop circuit for developing a control voltage in accordance with current flow through said first loop circuit; and utilization means coupled with said last-named means for control during periods when said collector is caused to reach a saturated condition.

References Cited in the file of this patent

UNITED STATES PATENTS

| | | |
|---|---|---|
| 2,013,795 | Tubbs | Sept. 10, 1935 |
| 2,662,123 | Koenig | Dec. 8, 1953 |
| 2,662,124 | McMillan | Dec. 8, 1953 |
| 2,673,892 | Richman | Mar. 3, 1954 |

OTHER REFERENCES

Radio-Craft, page 24, September 1948.

UNITED STATES PATENT OFFICE
CERTIFICATE OF CORRECTION

Patent No. 2,864,888 December 16, 1958

Hunter C. Goodrich

It is hereby certified that error appears in the printed specification of the above numbered patent requiring correction and that the said Letters Patent should read as corrected below.

Column 2, line 39, for "porvide" read -- provide --; column 7, line 43, for "output" read -- second loop --; column 8, line 70, for "colletcor" read -- collector --; column 9, line 3, for "curent" read -- current --.

Signed and sealed this 7th day of April 1959.

(SEAL)
Attest:

KARL H. AXLINE
Attesting Officer

ROBERT C. WATSON
Commissioner of Patents